United States Patent
Salmela et al.

(10) Patent No.: US 11,063,981 B2
(45) Date of Patent: Jul. 13, 2021

(54) GATEWAY, CLIENT DEVICE AND METHODS FOR FACILITATING SECURE COMMUNICATION BETWEEN A CLIENT DEVICE AND AN APPLICATION SERVER USING REDIRECT

(71) Applicant: TELEFONAKTIEBOLAGET LM ERICSSON (PUBL), Stockholm (SE)

(72) Inventors: Patrik Salmela, Espoo (FI); Mohit Sethi, Helsinki (FI); Kristian Slavov, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 223 days.

(21) Appl. No.: 15/758,793

(22) PCT Filed: Sep. 11, 2015

(86) PCT No.: PCT/EP2015/070877
§ 371 (c)(1),
(2) Date: Mar. 9, 2018

(87) PCT Pub. No.: WO2017/041861
PCT Pub. Date: Mar. 16, 2017

(65) Prior Publication Data
US 2019/0058735 A1    Feb. 21, 2019

(51) Int. Cl.
*G06F 7/04* (2006.01)
*G06F 15/16* (2006.01)
(Continued)

(52) U.S. Cl.
CPC .......... *H04L 63/20* (2013.01); *H04L 61/1511* (2013.01); *H04L 63/0884* (2013.01);
(Continued)

(58) Field of Classification Search
USPC .......................................................... 726/5
See application file for complete search history.

(56) References Cited

U.S. PATENT DOCUMENTS 8,472,388 B2   6/2013   Hjelm et al.
8,655,946 B2   2/2014   Hamada et al.
(Continued)

FOREIGN PATENT DOCUMENTS

WO    2014193278 A1    12/2014

OTHER PUBLICATIONS

International Search Report and Written Opinion issued in Application No. PCT/EP2015/070877 dated May 13, 2016, 12 pages.
(Continued)

*Primary Examiner* — Jeffrey C Pwu
*Assistant Examiner* — Samuel Ambaye
(74) *Attorney, Agent, or Firm* — Rothwell, Figg, Ernst & Manbeck, P.C.

(57) ABSTRACT

It is provided a method performed in a gateway and comprises the steps of: receiving a first client request from the client device, the first client request comprising a first fully qualified domain name, FQDN; transmitting a gateway request to the application server; receiving an application server response from the application server, the application server response indicating a need to provide authentication; generating a second FQDN, based on the first FQDN and an identifier of the client device; generating a client specific shared key based on the second FQDN and a shared key; generating a redirect message comprising the second FQDN, an authentication request, a context identifier and the client specific shared key; transmitting the redirect message to the client device; receiving a second client request from the (Continued)

client device; and generating an authentication response in case the second client request fails to comprise an authentication response.

21 Claims, 5 Drawing Sheets

(51) Int. Cl.
  H04L 29/06    (2006.01)
  H04W 4/38     (2018.01)
  H04W 12/06    (2021.01)
  H04W 12/0431  (2021.01)
  H04L 29/12    (2006.01)
  H04W 4/06     (2009.01)
  H04W 12/04    (2021.01)
  H04W 88/16    (2009.01)

(52) U.S. Cl.
  CPC .............. *H04W 4/06* (2013.01); *H04W 4/38* (2018.02); *H04W 12/04* (2013.01); *H04W 12/0431* (2021.01); *H04W 12/06* (2013.01); *H04W 88/16* (2013.01)

(56) References Cited

U.S. PATENT DOCUMENTS

| | | | |
|---|---|---|---|
| 2004/0233916 A1 | 11/2004 | Takeuchi et al. | |
| 2006/0271641 A1* | 11/2006 | Stavrakos | G06F 16/9574 709/217 |
| 2007/0288754 A1* | 12/2007 | Kaji | H04L 67/14 713/175 |
| 2011/0302627 A1* | 12/2011 | Blom | H04L 63/0492 726/2 |
| 2013/0007858 A1* | 1/2013 | Shah | H04L 63/0815 726/6 |

OTHER PUBLICATIONS

Gerdes, S. et al., "Delegated CoAP Authentication and Authorization Framework (DCAF)", draft-gerdes-ace-dcaf-authorize-02; ACE Working Group; Internet Engineering Task Force, IETF; Internet Society (ISOC), 4, Rue Des Falaises, Geneva, Switzerland; Mar. 10, 2015; XP015105544, 40 pages.

* cited by examiner

GATEWAY, CLIENT DEVICE AND METHODS FOR FACILITATING SECURE COMMUNICATION BETWEEN A CLIENT DEVICE AND AN APPLICATION SERVER USING REDIRECT

CROSS REFERENCE TO RELATED APPLICATION(S)

This application is a 35 U.S.C. § 371 National Stage of International Patent Application No. PCT/EP2015/070877, filed Sep. 11, 2015, designating the United States, the disclosure of which is incorporated by reference.

TECHNICAL FIELD

The technology relates to facilitating secure communication between a client device and an application server using a redirect message.

BACKGROUND

Capillary networks allow resource constrained client devices to communicate with application servers, using an intermediate gateway, e.g. connected via a mobile communication network. However, the application server may dictate the use of authentication credentials to allow access.

Conventionally, when a client device connects to the application server via a mobile communication network, credentials related to the mobile communication network, such as $3^{rd}$ Generation Partnership Project (3GPP) credentials can be used for authentication with the help of an authentication server, which may e.g. implement a Bootstrapping Server Function (BSF) when Generic Bootstrapping Architecture (GBA) is used.

However, in capillary networks, the client devices are often resource constrained devices that may not be able to handle or even store 3GPP credentials securely.

SUMMARY

An object is to provide a way in which client devices of a capillary network can connect securely to application servers.

According to a first aspect, it is provided a method for facilitating secure communication between a client device and an application server. The method is performed in a gateway and comprises the steps of: receiving a first client request from the client device, the first client request comprising a first fully qualified domain name, FQDN, for the application server; transmitting a gateway request to the application server, wherein the gateway request is based on the first client request; receiving an application server response from the application server, the application server response indicating a need to provide authentication; generating a second FQDN, based on the first FQDN and an identifier of the client device; generating a client specific shared key based on the second FQDN and a shared key which is not specific to the client device; generating a redirect message comprising the second FQDN, an authentication request, a context identifier and the client specific shared key; transmitting the redirect message to the client device; receiving a second client request from the client device; and generating an authentication response in case the second client request fails to comprise an authentication response.

The step of generating the second FQDN may be performed prior to the transmitting the gateway request; in which case the gateway request comprises the second FQDN and the redirect message comprises the second FQDN as a redirecting destination.

The redirect message may comprise the second FQDN as a separate parameter.

The method may further comprise the step of: refraining from generating an authentication response when the second client request comprises an authentication response.

The step of transmitting the gateway request may be a hypertext transfer protocol, HTTP, request having a get method, regardless of the method of the first client request.

The method may further comprise the step of: establishing, using the context identifier and the client specific shared key, a secure session between the gateway and the application server, for communication between the client device and the application server when the second client request fails to comprise an authentication response.

The step of generating the client specific shared key may comprise the use of a generic bootstrapping architecture, GBA.

According to a second aspect, it is provided a gateway for facilitating secure communication between a client device and an application server. The gateway comprises: a processor; and a memory storing instructions that, when executed by the processor, cause the gateway to: receive a first client request from the client device, the first client request comprising a first fully qualified domain name, FQDN, for the application server; transmit a gateway request to the application server, wherein the gateway request is based on the first client request; receive an application server response from the application server, the application server response indicating a need to provide authentication; generate a second FQDN, based on the first FQDN and an identifier of the client device; generate a client specific shared key based on the second FQDN and a shared key which is not specific to the client device; generate a redirect message comprising the second FQDN an authentication request, a context identifier and the client specific shared key; transmit the redirect message to the client device; receive a second client request from the client device; and generate an authentication response in case the second client request fails to comprise an authentication response.

The instructions to generate the second FQDN tray be performed prior to the instructions to transmit the gateway request; in which case the gateway request comprises the second FQDN and the redirect message comprises the second FQDN as a redirecting destination.

The redirect message may comprise the second FQDN as a separate parameter.

The gateway may further comprise instructions that, when executed by the processor, cause the gateway to refrain from generating an authentication response when the second client request comprises an authentication response.

The instructions to transmit the gateway request may further comprise instructions that, when executed by the processor, cause the gateway to transmit the gateway request being a hypertext transfer protocol, HTTP, request having a get method, regardless of the method of the first client request.

The gateway may further comprise instructions that, when executed by the processor, cause the gateway to establish a secure session between the gateway and the application server for communication between the client device and the application server when the second client request fails to comprise an authentication response.

The instructions to generate the client specific shared key may comprise instructions that, when executed by the processor, cause the gateway to use a generic bootstrapping architecture, GBA.

According to a third aspect, it is provided a gateway comprising: means for receiving a first client request front the client device, the first client request comprising a first fully qualified domain name, FQDN, for the application server; means for transmitting a gateway request to the application server, wherein the gateway request is based on the first client request; means for receiving an application server response from the application server, the application server response indicating a need to provide authentication; means for generating a second FQDN, based on the first FQDN and an identifier of the client device; means for generating a client specific shared key based on the second FQDN and a shared key which is not specific to the client device; means for generating a redirect message comprising the second FQDN, an authentication request, a context identifier and the client specific shared key; means for transmitting the redirect message to the client device; means for receiving a second client request from the client device; and means for generating an authentication response in case the second client request fails to comprise an authentication response.

According to a fourth aspect, it is provided a computer program for facilitating secure communication between a client device and an application server. The computer program comprises computer program code which, when run on a gateway cause the gateway to: receive a first client, request from the client device, the first client request comprising a first fully qualified domain name, FQDN, for the application server; transmit a gateway request to the application server, wherein the gateway request is based on the first client request; receive an application server response from the application server, the application server response indicating a need to provide authentication; generate a second FQDN, based on the first FQDN and an identifier of the client device generate a client specific shared key based on the second FQDN and a shared key which is not specific to the client device; generate a redirect message comprising the second FQDN, an authentication request, a context identifier and the client specific shared key; transmit the redirect message to the client device; receive a second client request from the client device; and generate an authentication response in case the second client request fails to comprise an authentication response.

According to a fifth aspect, it is provided a computer program product comprising a computer program according to the fourth aspect and a computer readable means on which the computer program is stored.

According to a sixth aspect, it is provided a method for facilitating secure communication between a client device and an application server. The method is performed in the client device and comprises the steps of: transmitting a first client request to a gateway, the first client request comprising a first fully qualified domain name, FQDN, for the application server; receiving a redirect message from the gateway, the redirect message comprising an authentication request, a context identifier, a client specific shared key and a second FQDN; generating an authentication response based on the context identifier and the client specific shared key; and transmitting a second client request to the gateway, the second client request comprising the authentication response and the second FQDN.

According to a seventh aspect, it is provided a client device for facilitating secure communication with an application server. The client device comprises: a processor; and a memory storing instructions that, when executed by the processor, causes the client device to: transmit a first client request to a gateway, the first client request comprising a first fully qualified domain name, FQDN, for the application server; receive a redirect message from the gateway, the redirect message comprising an authentication request, a context identifier, a client specific shared key and a second FQDN; generate an authentication response based on the context identifier and the client specific shared key; and transmit a second client request to the gateway, the second client request comprising the authentication response and the second FQDN.

According to an eighth aspect, it is provided a client device comprising: means for transmitting a first client request to a gateway, the first client request comprising a first fully qualified domain name, FQDN, for the application server; means for receiving a redirect message from the gateway, the redirect message comprising an authentication request, a context identifier, a client specific shared key and a second FQDN; means for generating an authentication response based on the context identifier and the client specific shared key; and means for transmitting a second client request to the gateway, the second client request comprising the authentication response and the second FQDN.

According to a ninth aspect, it is provided a computer program for facilitating secure communication with an application server, the computer program comprising computer program code which, when run on a client device causes the client device to: transmit a first client request to a gateway, the first client request comprising a first fully qualified domain name, FQDN, for the application server; receive a redirect message from the gateway, the redirect message comprising an authentication request, a context identifier, a client specific shared key and a second FQDN; generate an authentication response based on the context identifier and the client specific shared key; and transmit a second client request to the gateway, the second client request comprising the authentication response and the second FQDN.

According to a tenth aspect, it is provided a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
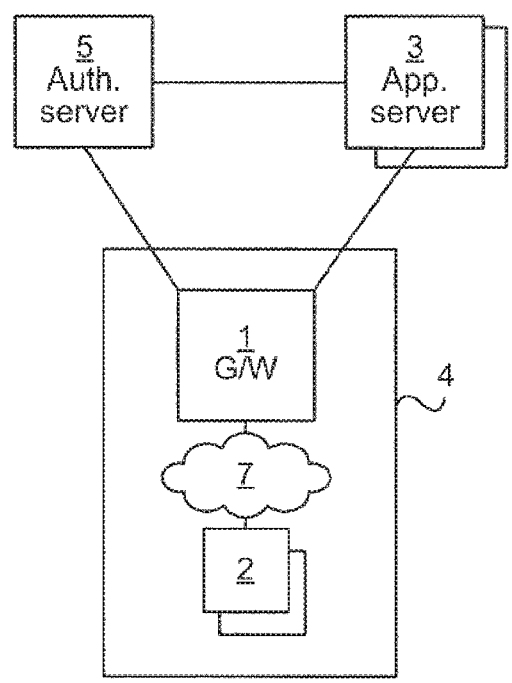
FIG. 1 is a schematic diagram illustrating an environment where embodiments presented herein can be applied.

FIG. 1 is a schematic diagram illustrating environments where embodiments presented herein can be applied. A number of client devices 2 are connected via a network 7 to a gateway 1. Each client device 2 communicates on occasion with one or more of a set of application servers 3. The connection between the client devices 2 and the gateway 1 can be wireless, e.g. using ZigBee, Wi-Fi (IEEE 802.11), Bluetooth, etc., or wired, e.g. using Ethernet, USB, a serial or parallel connection, etc. The client devices are optionally integrated in any suitable type of containing device, e.g. devices making use of a sensor device, an actuator device, or a sensor and actuator device. For instance, the containing device can be a home automation device, a vehicle or a home electronics device e.g. media player, camera, television, etc. It is to be noted that the client device can be a sensor and/or actuator in itself or the containing device.

The gateway 1 is in turn connected to one or more of the applications servers 3 to allow communication between the client devices 2 and the application servers 3. The application servers are any suitable server and can e.g. implement a Network Application Function (NAF) as defined in 3GPP TS 33.220 V12.0.0.

The connection between the gateway 1 and the application server 3 and the authentication server 5 may occur over an IP based network being wired based, wireless and/or using a mobile communication network. The mobile communications network may e.g. comply with any one or a combination of 3GPP (3$^{rd}$ Generation Partnership Project) standards such as LTE (Long Term Evolution) or UMTS utilising W-CDMA (Wideband Code Division Multiplex), or other standards such as CDMA2000 (Code Division Multiple Access 2000). The gateway 1 along with the network 7 and the client devices 2 are collectively called a capillary network 4. The connection between the gateway 1 and the application servers 3 and the authentication server 5 may also include a connection through a wide area network such as the Internet, providing no real restrictions on geographic separation between the application servers 3, authentication server 5 and the gateway 1.

The application server 3 may in some situations require that a connection to a client device 2 is to be encrypted and the client device be authenticated, A situation with a client device 2 without a gateway will now be described first.

The client device 2 then needs to have access to 3GPP credentials (or equivalent), such as e.g. in a USIM (Universal Subscriber Identity Module). The USIM can be provided using a physical card (such as a UICC, Universal Integrated Circuit Card) or by an electronically transferable subscriber identity module such as e.g. an MCIM (Machine Communications Identity Module). The client device 2 can then use the 3GPP credentials (or equivalent credentials) to obtain credentials using the authentication server 5 for authenticating itself towards the application server 3. The client device 2 is then authenticated by the application server 3 using the authentication server e.g. in accordance with the Generic Bootstrapping Architecture (see 3GPP TS 33.220 V12.0.0). The mutual authentication between the client device 2 and the application server 3 is based on the combination of the mutual authentication between the authentication server 5 and the device 2 as well as the trust relationship between the authentication server 5 and the application server 3. Hence, if the application server 3 does not have a direct or indirect (e.g. via an operator roaming agreement) trust relationship with the authentication server 5, it will not be able to communicate with the authentication server 5 to get the keys and thus cannot be authenticated by the client device 2.

The authentication server 5 can e.g. implement a Bootstrapping Server Function (BSF) where, using a mutual authentication between the client device and the BSF, a mutual authentication of the client device 2 and the application server 3 is also achieved. The client device can connect to the application server 3 and provide a context identifier such as e.g. a B-TID (Bootstrapping transaction identifier), which the application server 3 can use to query the authentication server 5 for the associated key. The result of this is that both the application server 3 and the client device 2 now share a secret key that can be used for security functions.

However, in many cases, the client devices 2 are constrained devices, such as sensor devices or actuator devices or a combination thereof, with low processing power, limited or no access to secure storage and minimal or no user interface. Alternatively, the client device is any device that does not have a SIM card or other 3GPP credentials, e.g. such as a laptop or desktop computer.

According to embodiments presented herein, when there is the need to utilize 3GPP based services from the constrained devices in the capillary network, e.g. through the Generic Bootstrapping Architecture (GBA), the client devices 2 are assisted by the gateway 1. The gateway 1 can act as a proxy between the client devices 2 and the application servers 3, communicating with the authentication server 5, generating a client specific shared key for each client device when needed and providing the client specific shared key to the client device in question so that client device can authenticate itself in communication with the application server 3. As is explained in more detail below, this not only allows such a client device 2 to connect to an application server 3 using the 3GPP credentials of the gateway 1, but also allows such a connection to be secure in relation to other client devices connecting to the same application server 3 using the same gateway 1. Depending on the capabilities of the particular client device 2, the gateway 1 can optionally also provide a secure session with the application server 3 on behalf of the client device 2.

The gateway 1 can be an HTTP (HyperText Transfer Protocol) proxy and/or a COAP (Constrained Application Protocol) proxy.

Figure 2:
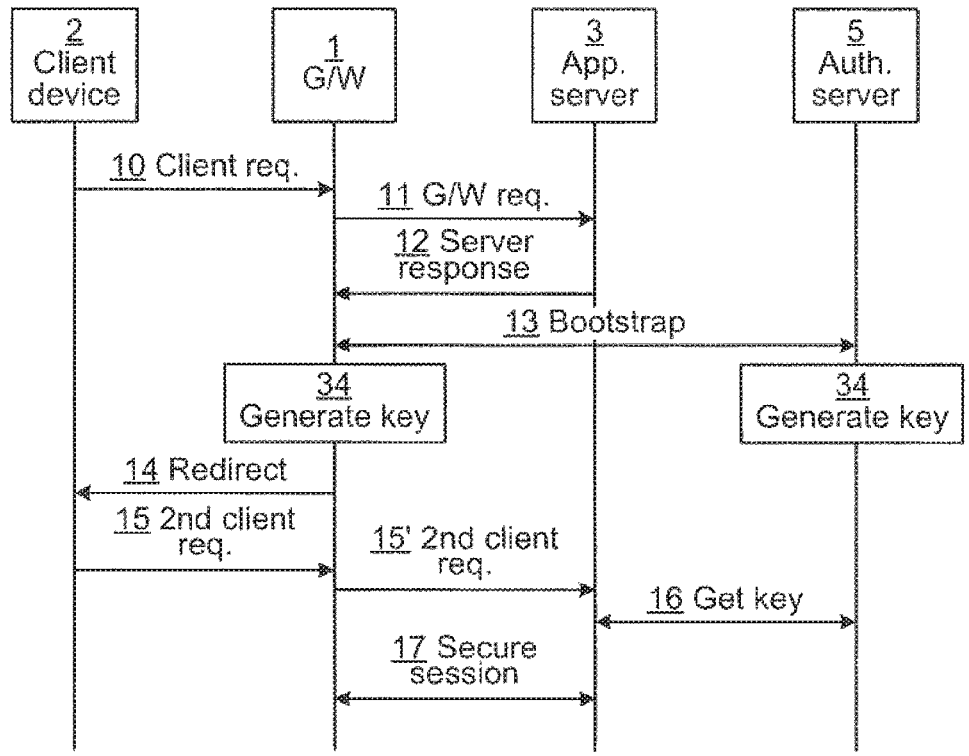
FIG. 2 is a sequence diagram illustrating an embodiment which can be applied in the environment shown in FIG. 1.

FIG. 2 is a sequence diagram illustrating an embodiment which can be applied in the environment shown in FIG. 1. This sequence diagram illustrates a scenario when the gateway is an endpoint of a secure session on behalf of a client device.

The client device 2 sends a first client request 10 to the gateway 1. The client request 10 can e.g. be an HTTP request or a COAP request. The client request 10 is a request to the application server 3. The client request 10 comprises a first (unmodified) FQDN (Fully Qualified Domain Name) which is a pointer to the application server 3, e.g. "naf.foo.com".

The gateway 1 then transmits a gateway request 11 to the application server 3. The gateway request 11 is based on the first client request 10. In one embodiment, the gateway request 11 is identical to the client request 10.

The application server 3 responds to the gateway request 11 with an application server response 12 to the gateway 1. To the application server 3, the gateway request is interpreted as a client request. The application server response 12 is of the same type as the gateway request 11, i.e. HTTP or COAP, respectively. Also, the application server response 12 here indicates a need to provide authentication. For instance, in the case of HTTP, the server response can include an HTTP status code of 401 "unauthorized", indicating that authentication is needed.

The gateway 1 then obtains a context identifier 13 from the authentication server 5. Also, the gateway and the authentication server each generate 34 respective instances of a shared key Ks, which is not specific to a client device. The context identifier and the key are to be used for setting up a secure connection between the client device 2 and the application server 3. In this embodiment, the context identifier is a B-TID parameter in accordance with GBA, but any suitable context identifier could be used. A second FQDN is generated based on the first FQDN and an identifier of the client device. For instance, a string for the client identifier could be added in a suitable position of the first FQDN, as explained in more detail below, e.g. resulting in a second FQDN of "client.naf.foo.com". The gateway 1 then generates 34 a client specific shared key based on the second FQDN and the shared key Ks. By using the client specific share key, the application server 3 is able to separate secure sessions between different client devices 2 even though the 3GPP authentication end point may be the same gateway 1.

The second FQDN, the authentication request (of the server response 12), the context identifier and the client specific shared key are then provided to the client device 2 in the form of a redirect response 14.

In this embodiment, the client device is incapable (or unwilling) to be an endpoint of a secure session with the application server using the credentials included in the redirect response 14 In a second client request 15 to the gateway 1, the client device 2 does not provide an authentication response to the authentication request. The gateway detects the absence of the authentication response from the client device 2 and generates an authentication response, such as an HTTP digest response, on behalf of the client device, based on the context identifier and the client specific shared key. The authentication response is then transmitted to the application server 3 as part of a modified second client request 15'.

The application server 3 gets the authentication response in the modified client authentication request 15' and uses the authentication response to validate the client by also using the authentication server. The application server 3 provides the context identifier and the second FQDN to the authentication server, which generates the client specific (due to the second FQDN being client specific) shared key. The authentication server then provides the client specific shared key to the application server which uses this to verify the validity of the authentication response.

A secure session 17 is then set up for the client device 2. In this scenario, the endpoint for the secure session 17 is in the gateway 1.

Figure 3:
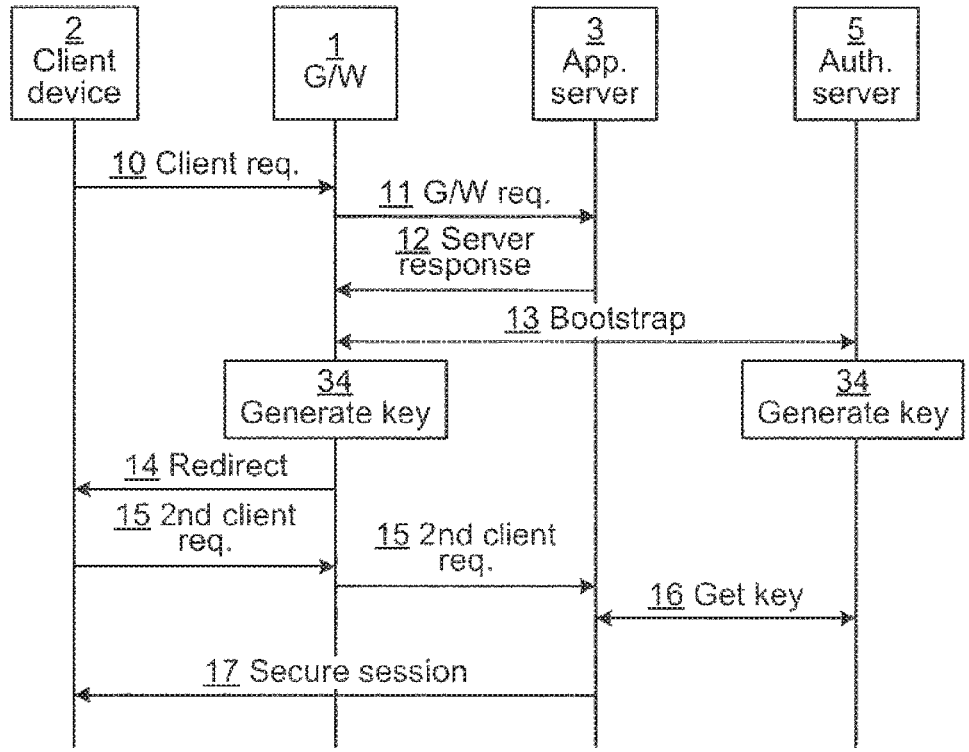
FIG. 3 is a sequence diagram illustrating an embodiment which can be applied in the environment shown in FIG. 1.

FIG. 3 is an alternative sequence diagram illustrating an embodiment which can be applied in the environment shown in FIG. 1. There are many similarities to the embodiment illustrated in FIG. 2 but here a scenario is illustrated where the client device is an endpoint for the secure session with the application server. Compared to FIG. 2, only modified steps and communication is mentioned here.

In this scenario, client device 2 creates an authentication response to the authentication request of the redirect message 14 using the credentials of the redirect message. The authentication response is then included in the second client request 15. The authentication response is detected by the gateway whereby the gateway knows not to generate the authentication response and only forwards the second client request 15 to the application server 3 without adding any (superfluous additional) authentication response.

The application server 3 responds in the same way as in FIG. 2, but since the authentication response was generated by the client device 2, the secure session 17 is established with the client device 2 as an endpoint.

Figure 4A:
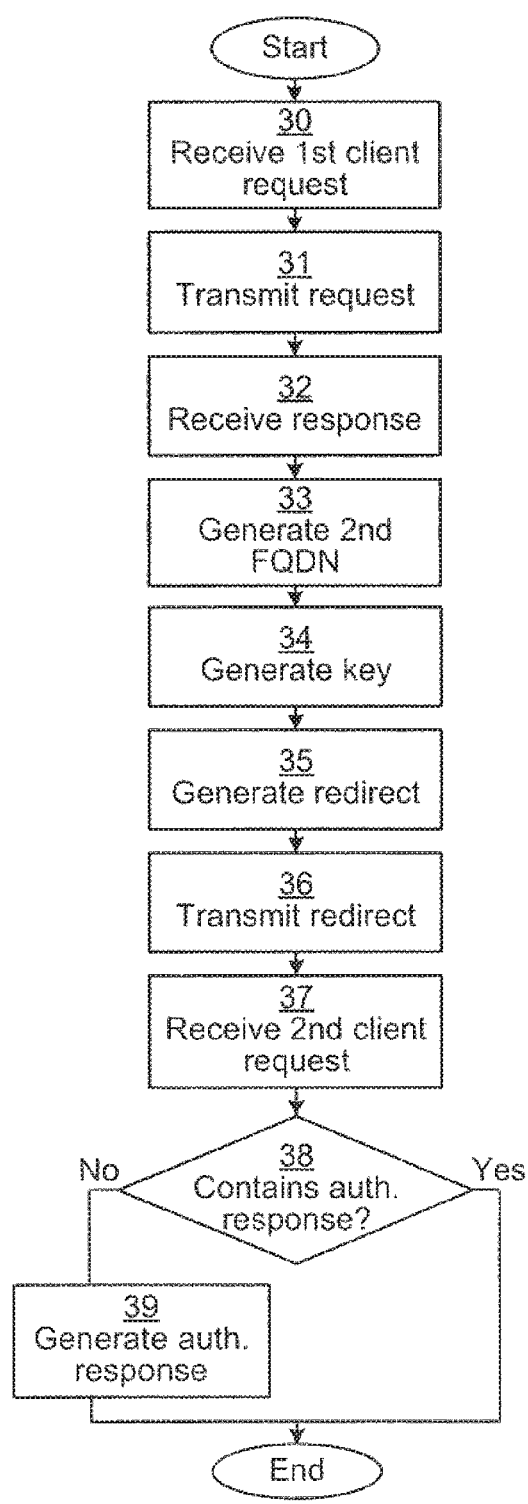
FIGS. 4A-C are flow charts illustrating methods for facilitating secure communication between the client device and application server of FIG. 1, performed by the gateway of FIG. 1.
Figure 4B:
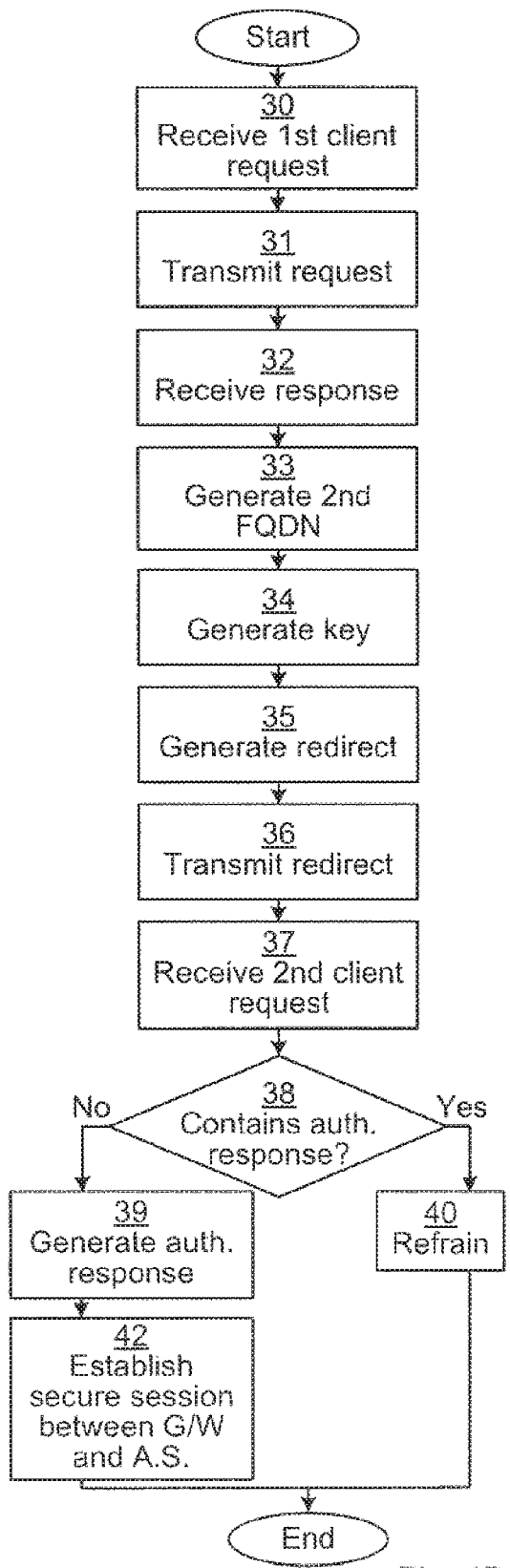
Figure 4C:
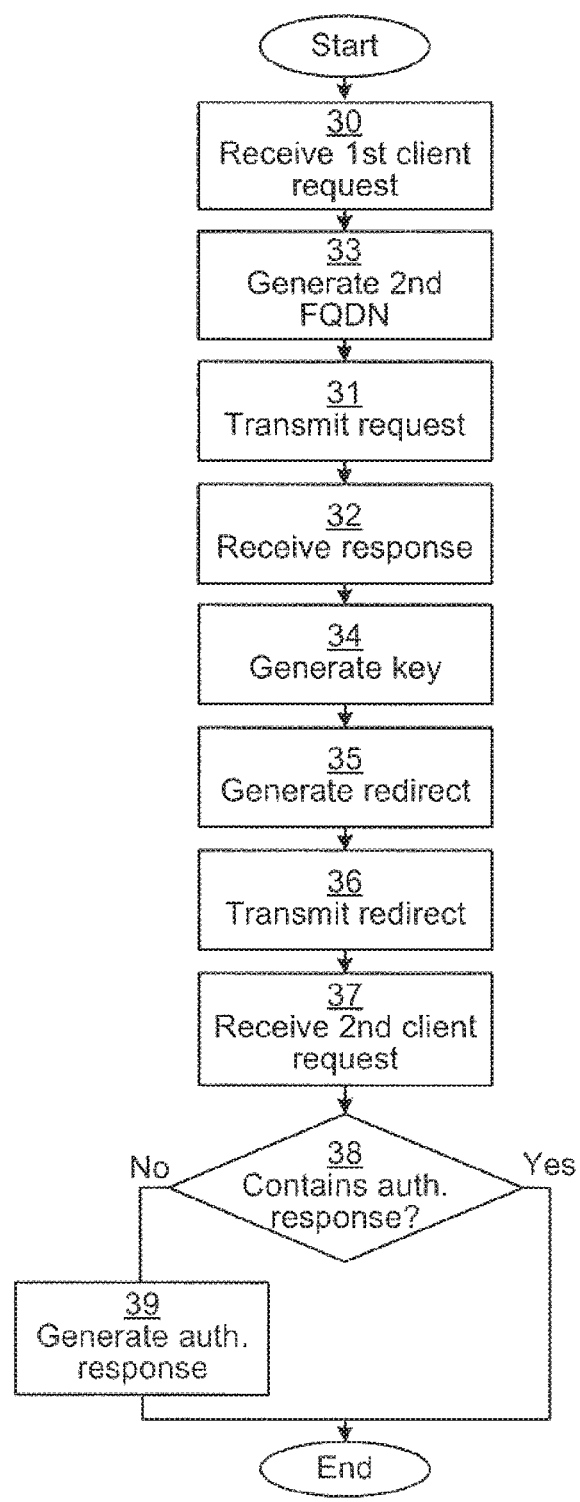

FIGS. 4A-C are flow charts illustrating methods for facilitating secure communication between the client device and application server of FIG. 1, performed by, the gateway of FIG. 1. The method corresponds to the actions of the gateway 1 in FIGS. 2 and 3.

In a receive $1^{st}$ client request step 30, a first client request is received from the client device. The first client request comprises a first fully qualified domain name, FQDN, for the application server.

In a transmit request step 31, a gateway request is transmitted to the application server, wherein the gateway request is based on the first client request.

Optionally, the gateway request is generated as a HTTP request having a GET method, regardless of the HTTP method of the first client request. The reason is that the GET command reveals minimal amount of information about the client device and the requested resource of the application server. In contrast, an HTTP POST method would carry some data of the device while GET on the same resource will only identify the resource in question (e.g. index.html). This means that the responsibility of protecting that data is moved to the application server, which is more capable of doing proper access control compared to a resource constrained client device.

In a receive response step 32, an application server response is received from the application server. The application server response indicates a need to provide authentication, e.g. in the form of an authentication request.

In a generate $2^{nd}$ FQDN step 33, a second FQDN is generated. The second FQDN is generated based on the first FQDN and an identifier of the client device. In other words, the second FQDN is client specific. For instance, if the first FQDN is "naf.foo.com" and the identifier of the client device is "clientx", the second FQDN can be generated by prepending the first FQDN with the client identifier and a separator (e.g. "."), whereby the second FQDN would be "clientx.naf.foo.com".

In a generate key step 34, a client specific shared key is generated based on the second FQDN and a shared key which is not specific to the client device. This is used in a delegated security solution and can e.g. comprise the use of a generic bootstrapping architecture, GBA.

In a generate redirect step 35, a redirect message is generated. The redirect message can be an HTTP 30× message, e.g. HTTP 302/303/307. The redirect message comprises the second FQDN, an authentication request, a context identifier and the client specific shared key. The context identifier and the client specific shared key can be collectively called credentials.

The gateway adds a location header to the redirect message indicating where the client device should redirect its request to. The location header is set to be the client device specific second FQDN (e.g. "clientx.naf.foo.com"). In one embodiment, the redirect message is an HTTP 303 message, instructing the client device to use a GET method in the next request regardless of what HTTP method was used for the first client request, improving privacy and security before there is an established secure session. It is to be noted that the credentials and authentication request can be included in the redirect message either as headers or as payload data.

In one embodiment, the redirect message comprises the second FQDN as a separate parameter, e.g. as a separate HTTP header.

In a transmit redirect step 36, the redirect message is transmitted to the client device.

In a receive $2^{nd}$ client request step 37, a second client request is received from the client device. The second client request uses the second FQDN since this was in the location header of the redirect message.

In a conditional contains authentication response step 38, it is determined whether the second client request comprises an authentication response or not. If the second client request comprises an authentication response, this indicates that the client device is capable of communicating securely with the application server. In such a case, the method ends and the client device is allowed to provide the secure session with the application server. On the other hand, if the second client request fails to comprise an authentication response, this indicates that the client device is not capable of communicating securely with the application server, in which case the method proceeds to a generate authentication response step 39.

In the generate authentication response step 39, an authentication response is generated on behalf of the client device, using the client specific shared key.

In this method, by generating a redirect message based on the application server response and including the credentials, instead of simply forwarding the application server response, the gateway can distinguish between client devices which are aware and unaware of the procedure of using the context identifier and client specific shared key for secure communication. Client devices which are unaware of the procedure will follow the redirect without providing an authentication response, thereby implicitly signalling to the gateway that they do not understand to use the provided credentials in the redirect message. This will tell the gateway that it should act as a security proxy for the device, i.e. being an end point of the secure session (as illustrated FIG. 2). A device aware of the procedure will notice the authentication request in the redirect message, extract the embedded credentials, and generate the authentication response instead of following the redirect. In this way, the client device will not need the gateway as a security proxy and the client device is an endpoint in the secure session (as illustrated in FIG. 3). Hence, client devices which are incapable of generating the authentication response (such as HTTP digest response), e.g. if they do not support HTTP, will automatically be detected as unaware of the procedure by the gateway by the fact that they do not use HTTP for contacting the application server Using this method, the delegated security solution works both for devices that are aware of delegated security and devices that are not. Devices that are not aware of delegated security procedure will in this way be provided with a secure session for the path between the gateway and the application server. This scenario results in a split up security solution, i.e. from the client device to the gateway and from the gateway to the application server. While this is not as secure as for devices that are aware of the procedure (as they end up with end-to-end security from the client device to the application server) it still provides for a much better situation than having no security between the gateway and the application server.

Without such a distinction, if the gateway expects all client devices to use the credentials for security, client devices that are not aware of this procedure would not get any, or at least not secure, connectivity to the application server because they are unable to respond to the received authentication request. Using this distinction, all devices will get connectivity to the application server in a secure session, either from the gateway or from the client device. Also, devices that do not support HTTP (e.g. only COAP) can get the split security by the gateway.

Looking now at FIG. 4B, only new or modified steps compared to the method illustrated by the flow chart of FIG. 4A will be described.

In the refrain step 40, the gateway refrains from generating an authentication response. This step if performed when the second client request comprises an authentication response. In practice, this step can be empty, i.e. no operation.

In an establish secure session between G/W (gateway) and A.S. (Application Server) step 42, the gateway establishes, using the context identifier and the client specific shared key, a secure session between the gateway and the application server. This can be set up using HTTPS (HTTP Secure)/TLS (Transport Layer Security). The secure session can then be used for communication between the client device and the application server when the client device is incapable of being an end device in such communication, which is indicated by the second client request failing to comprise an authentication response.

Looking now to FIG. 4C, only new or modified steps compared to the method illustrated by the flow chart of FIG. 4A will be described. It is to be noted that one or more of the features illustrated in FIG. 4B can optionally be combined with the embodiment of FIG. 4C.

Here, the generate $2^{nd}$ FQDN step 33 is performed prior to the transmit request step 31. In this way, the $2^{nd}$ FQDN can be included in the gateway request, e.g. as an HTTP header for host.

Also, in the generate redirect step 35, the redirect message comprises the second FQDN as the redirecting destination.

Using this method, the application server is provided with the second FQDN as the host field and can use for the authentication challenge. In this way, the client device specific FQDN is used also by the client device or gateway when generating the authentication response, providing consistency and transparency to the client specific second FQDN for the application server.

Figure 5:
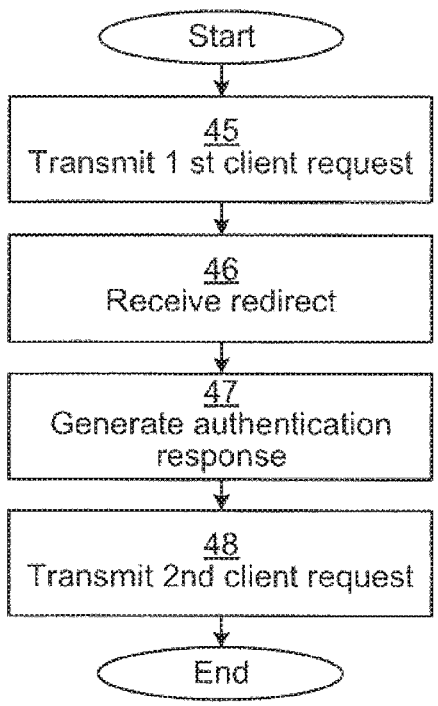
FIG. 5 is a flow chart illustrating a method facilitating secure communication between the client device and application server performed by a gateway of FIG. 1.

FIG. 5 is a flow chart illustrating methods facilitating secure communication between the client device and application server performed by a gateway of FIG. 1. The method is performed in the client device 2 and corresponds to the actions of the client device 2 in FIGS. 2 and 3.

In a transmit 1$^{st}$ client request step 45, a first client request is transmitted to a gateway. The first client request comprises a FQDN for the application server.

In a receive redirect step 46, a redirect message is received from the gateway. The redirect message comprises an authentication request, a context identifier, a client specific shared key and a second FQDN.

In a generate authentication response step 47, an authentication response generated based on the context identifier and the client specific shared key, provided in the redirect step. This step corresponds to the generate authentication response step 39 of FIGS. 4A-C, but is here performed in the client device.

In a transmit 2$^{nd}$ client request step 48, a second client request is transmitted to the gateway. The second client request comprises the authentication response and the second FQDN.

Here, the client device is aware of the procedure of the client device generating the authentication response using the provided credentials. The client device thus notices the authentication request when it receives in the redirect message, extracts the embedded credentials, and generates the authentication response. When the gateway receives the second client request, the gateway will see that the authentication response is included and will thus refrain from generating an authentication response.

Figure 6:
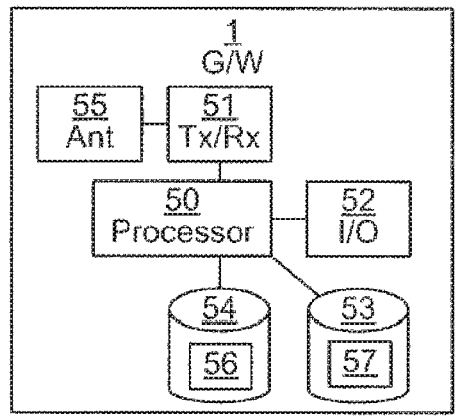
FIG. 6 is a schematic diagram showing some components of the gateway of FIG. 1.

FIG. 6 is a schematic diagram showing some components of the gateway 1 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIG. 4A-C above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM). The memory 53 also comprises credentials 57, such as 3GPP credentials, e.g. stored in a USIM. The USIM can be provided using a physical card or by an electronically transferable subscriber identity module such as an MCIM.

The gateway 1 further comprises an I/O interface 52 for communicating with other external entities, e.g. using a wired network connection, such as Ethernet. Optionally, the I/O interface 52 also includes a user interface.

The gateway 1 also comprises one or more transceivers 51, comprising analogue and digital components, and a suitable number of antennas 55 for wireless communication with client devices and with radio base stations of a mobile communication network (to thereby gain access to one or more application servers and one or more authentication servers). Optionally, the one or more application servers and one or more authentication servers are instead reachable via a wired IP based network, such as over an Ethernet connection or a wireless IP based network, such as Wi-Fi (any IEEE 802.11x standard).

Other components of the gateway 1 are omitted in order not to obscure the concepts presented herein.

Figure 7:
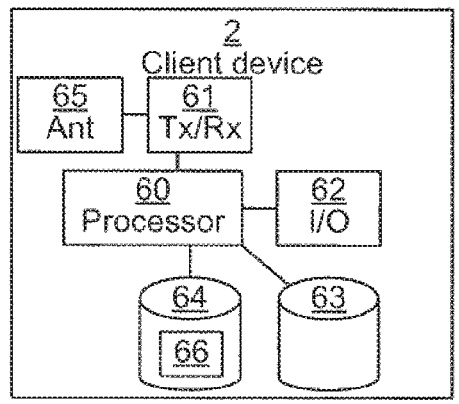
FIG. 7 is a schematic diagram showing some components of a client device of FIG. 1.

FIG. 7 is a schematic diagram showing some components of the client device 2 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60, e.g. to perform any of the embodiments of methods described above with reference to FIG. 5. The data memory 63 can be any combination of read and write memory (RAM) and read only memory (ROM), e.g. in the form of a persistent storage, which, for example, can be any single one or combination of magnetic memory, optical memory, solid state memory or even remotely mounted memory.

The client device 2 further comprises an I/O interface 62 for communicating with external entities and optionally comprises a user interface.

The client device 2 may also comprise one or more transceivers 61, comprising analogue and digital components, and a suitable number of antennas 65 for wireless communication with a gateway or other radio communication entities such as a radio base station, to thereby gain access to one or more application servers.

Other components of the client device 2 are omitted in order not to obscure the concepts presented herein.

Figure 8:
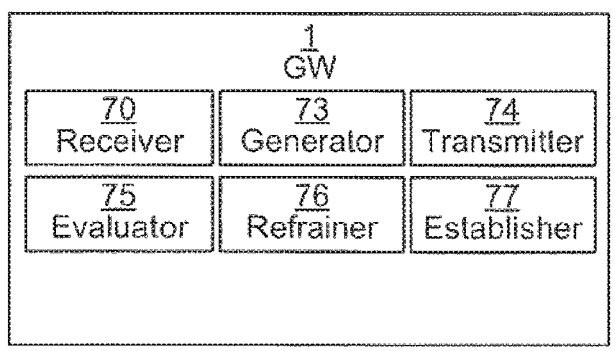
FIG. 8 is a schematic diagram showing functional modules of the gateway of FIGS. 1 and 6.

FIG. 8 is a schematic diagram showing functional modules of the gateway of FIGS. 1 and 6. The modules can be implemented using software instructions such as a computer program executing in the gateway 1 and/or using hardware, such as application specific integrated circuits, field programmable gate arrays, discrete logical components, transceivers, etc. The modules correspond to the steps in the method illustrated in FIGS. 4A-C.

A receiver 70 corresponds to steps 30 and 37. A generator 73 corresponds to steps 33, 34 and 35. A transmitter 74 corresponds to steps 31 and 36. An evaluator 75 corresponds to step 38. A refrainer 76 corresponds to step 40. An establisher 77 corresponds to step 42.

Figure 9:
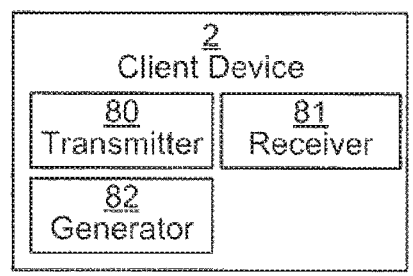
FIG. 9 is a schematic diagram showing functional modules of a client device of FIGS. 1 and 7.
Figure 10:
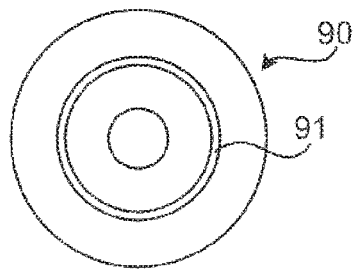
FIG. 10 shows one example of a computer program product 90 comprising computer readable means.

FIG. 9 is a schematic diagram showing functional modules of a client device of FIGS. 1 and 7. The modules can be implemented using software instructions such as a computer program executing in the client device and/or using hardware, such as application specific integrated circuits, field programmable gate arrays, discrete logical components, transceivers, etc. The modules correspond to the steps in the methods illustrated in FIG. 5.

A transmitter 80 corresponds to steps 45 and 48. A receiver corresponds to step 46. A generator corresponds to step 47.

FIG. 11 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc or a Blu-Ray disc. As explained above, the computer program product could also be embodied in a memory of a device, such as the computer program product 56 of FIG. 6 or the computer program product 66 of FIG. 7. While the computer program 91 is here schematically shown as a track on the depicted optical disk, the computer program can be stored in any way which is suitable for the it computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for facilitating secure communication between a client device and an application server, the method being performed in a gateway and comprising the steps of:
receiving a first client request from the client device, the first client request comprising a first fully qualified domain name (FQDN) for the application server;
transmitting a gateway request to the application server, wherein the gateway request is based on the first client request;
receiving an application server response from the application server, the application server response indicating a need to provide authentication;
generating a second FQDN, based on the first FQDN and an identifier of the client device;
generating a client specific shared key based on the second FQDN and a shared key which is not specific to the client device;
generating a redirect message comprising the second FQDN, an authentication request, a context identifier and the client specific shared key;
transmitting the redirect message to the client device;
receiving a second client request from the client device; and
generating an authentication response in case the second client request fails to comprise an authentication response.

2. The method of claim 1, wherein the step of generating the second FQDN is performed prior to the transmitting the gateway request; and wherein the gateway request comprises the second FQDN and the redirect message comprises the second FQDN as a redirecting destination.

3. The method of claim 1, wherein the redirect message comprises the second FQDN as a separate parameter.

4. The method of claim 1, wherein the step of transmitting the gateway request is a hypertext transfer protocol, HTTP, request having a get method, regardless of the method of the first client request.

5. The method of claim 1, further comprising the step of:
establishing, using the context identifier and the client specific shared key, a secure session between the gateway and the application server, for communication between the client device and the application server when the second client request fails to comprise an authentication response.

6. The method of claim 1, wherein the step of generating the client specific shared key comprises the use of a generic bootstrapping architecture, GBA.

7. A gateway for facilitating secure communication between a client device and an application server, the gateway comprising:
a processor; and
a memory storing instructions that, when executed by the processor, cause the gateway to:
receive a first client request from the client device, the first client request comprising a first fully qualified domain name (FQDN) for the application server;
transmit a gateway request to the application server, wherein the gateway request is based on the first client request;
generate a second FQDN, based on the first FQDN and an identifier of the client device;
generate a client specific shared key based on the second FQDN and a shared key which is not specific to the client device;
generate a redirect message comprising the second FQDN an authentication request, a context identifier and the client specific shared key;
transmit the redirect message to the client device; and
generate an authentication response in case a second client request transmitted by the client device fails to comprise an authentication response.

8. The gateway of claim 7, wherein the instructions to generate the second FQDN are performed prior to the instructions to transmit the gateway request; and wherein the gateway request comprises the second FQDN and the redirect message comprises the second FQDN as a redirecting destination.

9. The gateway of claim 7, wherein the redirect message comprises the second FQDN as a separate parameter.

10. The gateway of claim 7, wherein the instructions to transmit the gateway request further comprise instructions that, when executed by the processor, cause the gateway to transmit the gateway request being a hypertext transfer protocol, HTTP, request having a get method, regardless of the method of the first client request.

11. The gateway of claim 7, further comprising instructions that, when executed by the processor, cause the gateway to establish a secure session between the gateway and the application server for communication between the client device and the application server when the second client request fails to comprise an authentication response.

12. The gateway of claim 7, wherein the instructions to generate the client specific shared key comprise instructions that, when executed by the processor, cause the gateway to use a generic bootstrapping architecture, GBA.

13. A computer program product comprising a non-transitory computer readable medium storing a computer program for facilitating secure communication between the client device and the application server, the computer program comprising computer program code which, when run on the gateway causes the gateway to perform the method of claim 1.

14. A method for facilitating secure communication between a client device and an application server, the method being performed in the client device and comprising the steps of:
transmitting a first client request to a gateway, the first client request comprising a first fully qualified domain name (FQDN) for the application server;
receiving a redirect message from the gateway, the redirect message comprising an authentication request, a context identifier, a client specific shared key and a second FQDN, wherein the second FQDN is generated based on the first FQDN and an identifier of the client device;

generating an authentication response based on the context identifier and the client specific shared key; and transmitting a second client request to the gateway, the second client request comprising the authentication response and the second FQDN.

15. A client device for facilitating secure communication with an application server, the client device comprising:

a processor; and a memory storing instructions that, when executed by the processor, causes the client device to:

transmit a first client request to a gateway, the first client request comprising a first fully qualified domain name (FQDN) for the application server;

obtain from a received redirect message that was transmitted by the gateway an authentication request, a context identifier, a client specific shared key, and a second FQDN, wherein the second FQDN is generated based on the first FQDN and an identifier of the client device;

generate an authentication response based on the context identifier and the client specific shared key; and transmit a second client request to the gateway, the second client request comprising the authentication response and the second FQDN.

16. A computer program product comprising a non-transitory computer readable medium storing a computer program for facilitating secure communication between the client device and the application server, the computer program comprising computer program code which, when run on the client device causes the client device to perform the method of claim 14.

17. The method of claim 1, wherein the second FQDN contains the first FQDN and the identifier of the client device.

18. The method of claim 14, wherein the second FQDN contains the first FQDN and the identifier of the client device.

19. The method of claim 1, the method further comprising the gateway obtaining the context identifier from an authentication server.

20. The method of claim 1, the method comprising:

the gateway determining whether the second client request comprises an authentication response; and as a result of determining that the second client request lacks an authentication response, modifying the second client request to include an authentication response and sending the modified second client request toward the application server.

21. The gateway of claim 7, wherein the instructions further cause the gateway to:

determine whether the second client request comprises an authentication response; and as a result of determining that the second client request comprises an authentication response, forward the second client request toward the application server.

* * * * *